(12) United States Patent
Ishigaki

(10) Patent No.: US 11,305,590 B2
(45) Date of Patent: Apr. 19, 2022

(54) TIRE

(71) Applicant: SUMITOMO RUBBER INDUSTRIES, LTD., Hyogo (JP)

(72) Inventor: Yuichi Ishigaki, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 196 days.

(21) Appl. No.: 16/249,401

(22) Filed: Jan. 16, 2019

(65) Prior Publication Data
US 2019/0241022 A1 Aug. 8, 2019

(30) Foreign Application Priority Data

Feb. 5, 2018 (JP) .............................. JP2018-018503

(51) Int. Cl.
*B60C 11/12* (2006.01)
*B60C 11/03* (2006.01)

(52) U.S. Cl.
CPC ...... *B60C 11/1218* (2013.01); *B60C 11/0323* (2013.01); *B60C 11/1272* (2013.01); *B60C 11/1281* (2013.01); *B60C 11/032* (2013.01); *B60C 11/124* (2013.01); *B60C 2011/1213* (2013.01)

(58) Field of Classification Search
CPC ............. B60C 11/1218; B60C 11/0323; B60C 11/1272; B60C 11/1281; B60C 11/032; B60C 11/124; B60C 2011/1213
See application file for complete search history.

(56) References Cited

U.S. PATENT DOCUMENTS

| 5,803,999 A * | 9/1998 | Shibata ..................... B60C 3/04 |
| | | 152/209.14 |
| 2011/0168311 A1* | 7/2011 | Voss ..................... B60C 11/1218 |
| | | 152/209.18 |
| 2013/0306208 A1* | 11/2013 | Kageyama .............. B60C 11/01 |
| | | 152/209.16 |
| 2020/0180362 A1* | 6/2020 | Kaji ..................... B60C 11/1272 |

FOREIGN PATENT DOCUMENTS

| JP | H 04100707 | * | 8/1990 | ............. B60C 11/11 |
| JP | H02310108 A | * | 12/1990 | ............. B60C 11/12 |
| JP | 5179668 B | | 4/2013 | |

* cited by examiner

*Primary Examiner* — Matthew J Daniels
*Assistant Examiner* — Shibin Liang
(74) *Attorney, Agent, or Firm* — Greenblum & Bernstein, P.L.C.

(57) ABSTRACT

A tyre includes a tread portion including a land portion having a ground contact surface and at least one sidewall. The land portion is provided with a radial channel extending from a radially outer end opened at the ground contact surface to a radially inner end, an internal lateral channel extending under the ground contact surface within the land portion and having one end opened at the at least one sidewall and communicating with the radially inner end of the radial channel, and a sipe opened at the ground contact surface and communicating with the radial channel and the internal lateral channel. The radially outer end of the radial channel has an axial opening width in a range of from 5% to 20% of an axial width of the land portion.

16 Claims, 5 Drawing Sheets

TIRE

BACKGROUND ART

Field of the Disclosure

The present disclosure relates to tyres, and more particularly to a tyre for automobiles.

Description of the Related Art

The following Patent document 1 discloses a tyre having a tread element, e.g., a rib or lug, provided with a radial groove, a submerged lateral groove, and a sipe. The radial groove extends radially inwardly from a contact surface of the tread element. The submerged lateral groove extends laterally within the tread element from an end opened at a sidewall of the tread element. The sipe extends between the contact surface of the tread element and the submerged lateral groove.

PATENT DOCUMENT 1

JP5179668B

SUMMARY OF THE DISCLOSURE

Recent years, the tyres as mentioned above has been required to improve wet performance and on-ice performance in a well-balanced manner.

In view of the above circumstances in the conventional art, the present disclosure has an object to provide a tyre capable of improving wet performance and on-ice performance in a well-balanced manner.

In one aspect of the disclosure, a tyre includes a tread portion including at least one land portion, and the at least one land portion has a ground contact surface and at least one sidewall. The at least one land portion is provided with at least one radial channel extending to a radially inner end thereof from a radially outer end thereof opened at the ground contact surface, at least one internal lateral channel provided under the ground contact surface of the land portion and extending from one end thereof opened at the at least one sidewall to the at least one radial channel, and at least one sipe extending radially inwardly from the ground contact surface to communicate with both the at least one radial channel and the at least one internal lateral channel. The radially outer end of the at least one radial channel has an axial opening width in a range of from 5% to 20% of an axial width of the at least one land portion.

In another aspect of the disclosure, the at least one internal lateral channel may be inclined at an angle equal to or less than 45 degrees with respect to a tyre axial direction.

In another aspect of the disclosure, the at least one internal lateral channel may have a channel cross-section having a maximum diameter of from 3 to 8 mm.

In another aspect of the disclosure, the at least one internal lateral channel may include a first internal lateral channel and a second internal lateral channel extending in a direction crossing the first internal lateral channel.

In another aspect of the disclosure, the at least one radial channel may include a first radial channel and a second radial channel extending in a direction crossing the first radial channel.

In another aspect of the disclosure, the at least one land portion may include axially spaced two sidewalls, and the at least one internal lateral channel is opened at the respective sidewalls.

DESCRIPTION OF THE PREFERRED EMBODIMENTS

Figure 1:
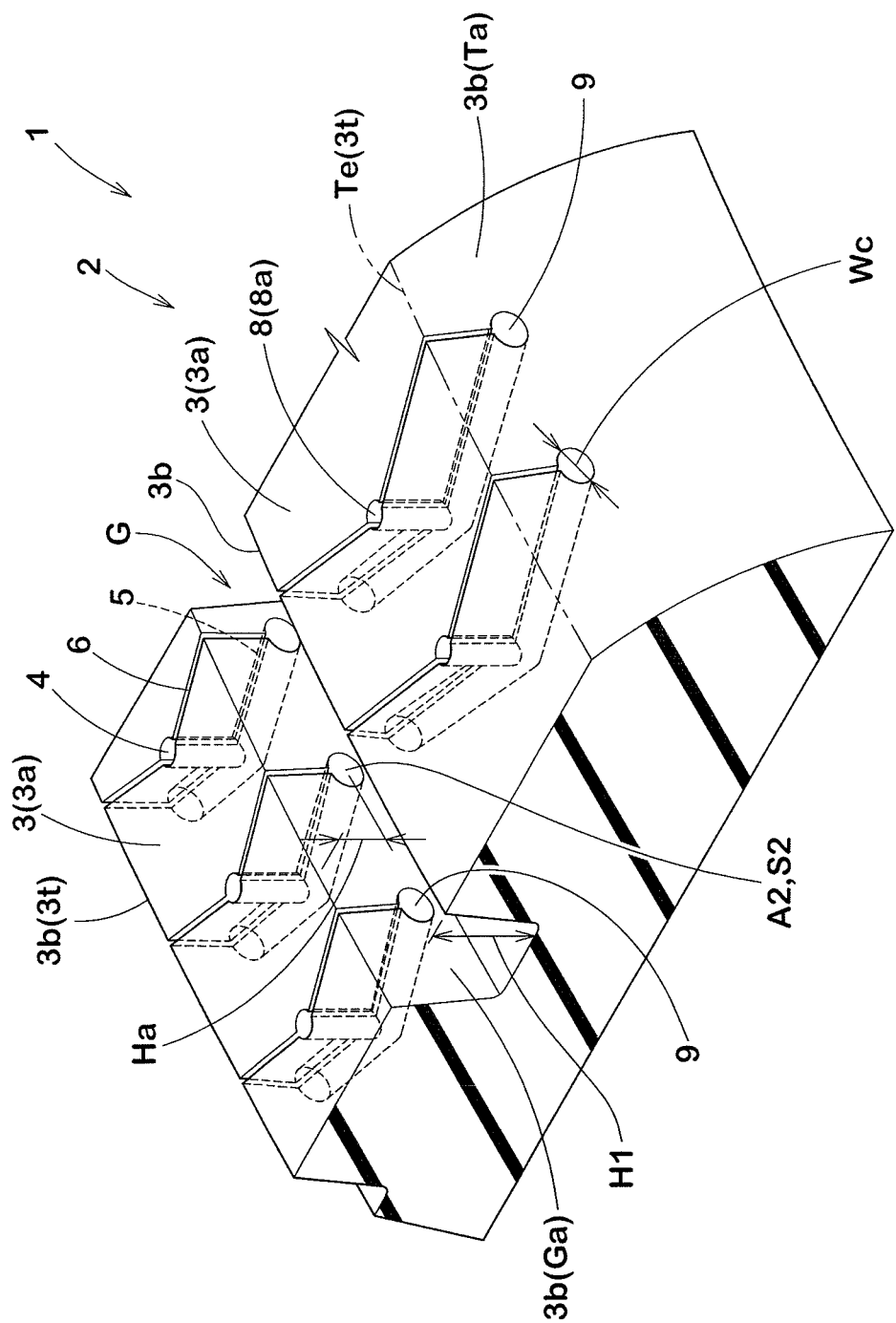
FIG. 1 is a partial perspective view of a tread portion of a tyre according to an embodiment of the disclosure.

An embodiment of the present disclosure will be explained below with reference to the accompanying drawings. Note that like elements are denoted with the same reference numeral numbers throughout the disclosure, and repeated explanation thereof is omitted.

Figure 2:
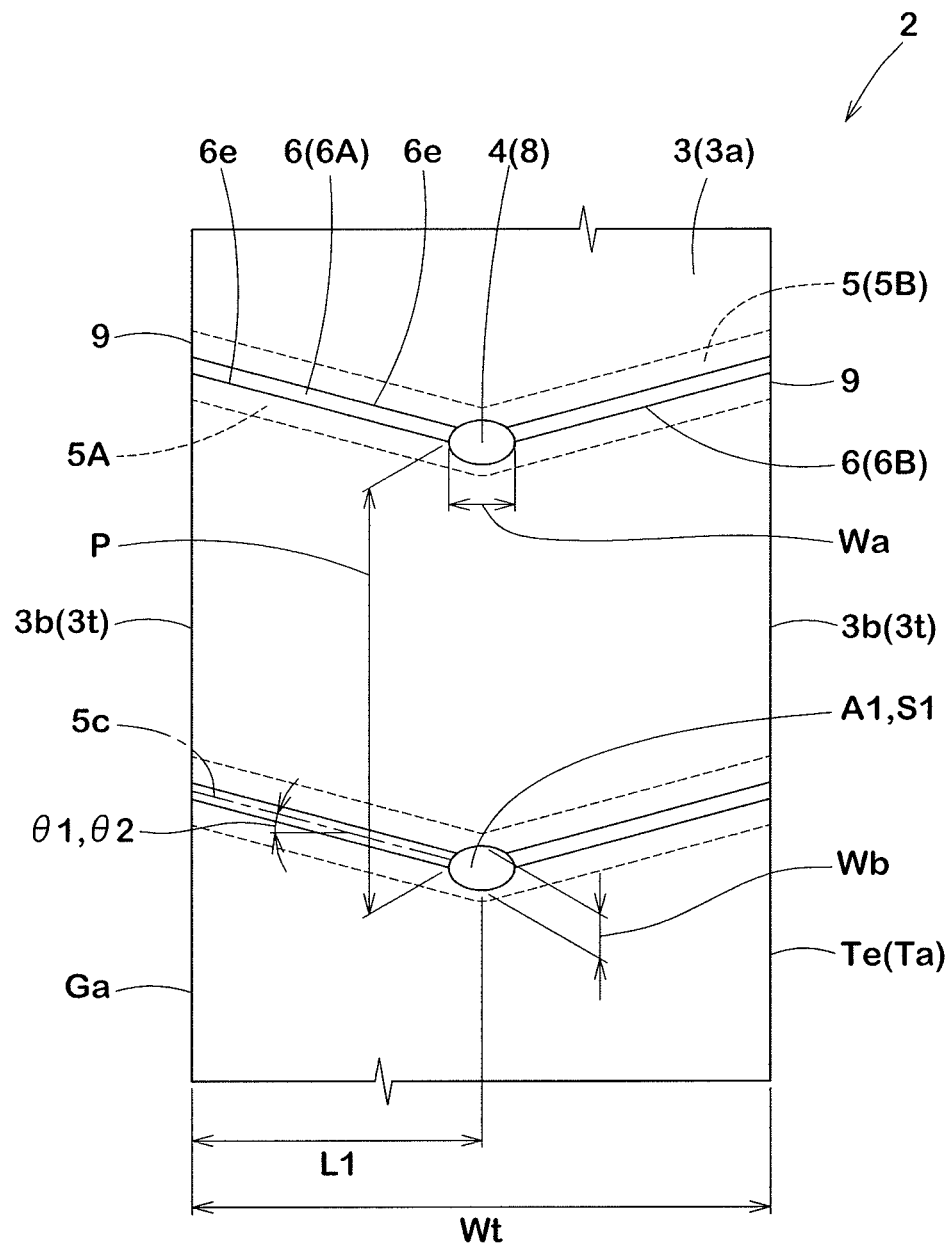
FIG. 2 is a plan view of a land portion of FIG. 1.

FIG. 1 illustrates a partial perspective view of a tread portion 2 of a tyre 1 according to an embodiment of the disclosure. FIG. 2 illustrates a developed plan view of a land portion 3 of FIG. 1. In this embodiment, as a preferred embodiment, a passenger car tyre is illustrated. Alternately, the disclosure, for example, can be employed for other various kinds of tyres, e.g., motorcycle tyres, heavy-duty tyre, and non-pneumatic tyres.

As illustrated in FIG. 1 and FIG. 2, the tread portion 2 includes one or more land portions 3 each having a ground contact surface 3a and at least one sidewall 3b. The ground contact surface 3a is a surface that comes into contact with the ground. The sidewall 3b is a surface that extends radially inwardly from an end edge 3t of the ground contact surface 3a. In some preferred embodiments, one or more land portions 3 include axially spaced two sidewalls 3b. Note that the sidewalls 3b can be embodied in various aspects.

The sidewalls 3b, for example, may be formed by groove walls Ga of circumferentially and continuously extending main grooves G, or buttress surfaces Ta which extend radially inwardly from tread edges Te. In the sidewalls 3b of land portion 3 shown in FIG. 2, one is formed by one of the groove walls Ga, and the other one is formed by one of the buttress surfaces Ta. Note that the land portions 3 are not limited to such an aspect but can be modified such that the sidewalls 3b are formed by two groove walls Ga, for example.

The tread edges Te refer to axially outermost edges of the ground contacting patch of the tread portion 2 which occurs under a normally inflated loaded condition when the camber angle of the tyre is zero.

The normally inflated loaded condition is such that the tyre 1 is mounted on a standard wheel rim (not illustrated) and inflated to a standard pressure and loaded with a standard tyre load. In this application including specification and claims, various dimensions, positions and the like of the tyre refer to those under a normally inflated unloaded condition of the tyre unless otherwise noted. The normally inflated unloaded condition is such that the tyre 1 is mounted on the standard wheel rim with a standard pressure but loaded with no tyre load.

The standard wheel rim is a wheel rim officially approved or recommended for the tyre by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tyre by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tyre load is a tyre load officially approved or recommended for the tyre by standards organizations, wherein the standard load is the "maximum load capacity" in JATMA, the "Load Capacity" in ETRTO, and the maximum value given in the above-mentioned table in TRA or the like.

The land portions 3 according to the embodiment is provided with at least one radial channel 4, at least one internal lateral channel 5, and at least one sipe 6. In this embodiment, a plurality of radial channels 4, internal lateral channels 5, and sipes 6 are provided. The radial channels 4 each extend radially inwardly from a radially outer end thereof which is opened at the ground contact surface 3*a*. The internal lateral channels 5 each extend under the ground contact surface 3*a* and have at least one end opened at one of the sidewalls 3*b*. The internal lateral channels 5 each communicate with a radially inner end of one of the radial channels 4. The sipes 6 each extend from the ground contact surface 3*a* to communicate with both at least one radial channel 4 and at least one internal lateral channel 5.

Thus, water between the ground contact surface 3*a* and the ground can be drained by the internal lateral channels 5 through the radial channels 4, improving wet performance. The internal lateral channels 5, after the tread portion 2 has worn, become grooves which exposed at a worn tread surface, ensuring wet performance after worn. Further, the sipes 6 can not only scratch icy road by the edges 6*e* to improve on-ice traction but also suck up the water to drain through the internal lateral channels 5. Furthermore, when air comes into the sipes 6, the air can push the water remaining in the internal lateral channels 5 outwardly therefrom. Accordingly, the tyre 1 according to the embodiment can provide superior driving performance on wet and icy road conditions.

As used herein, the radial channels 4 and the internal lateral channels 5 mean voids having a width equal to or greater than 1 mm, and the sipes 6 mean narrow cuts having a width less than 1 mm.

The radially outer ends of the radial channels have axial opening widths Wa in a range of from 5% to 20% of an axial width Wt of the land portion 3. In the present disclosure, the inventor has paid attention to the relationship between the opening widths Wa of the radial channels 4 and the axial widths Wt of the land portions 3 on which the radial channels 4 are provided. This feature ensures sufficient lengths of edges 6*e* of the sipes 6 while suppressing excessive reduction in rigidity of the land portions 3. Thus, the edges 6*e* of the sipes 6 can generate a large on-ice traction by scratching icy road strongly. Further, since sufficient opening widths Wa of the radial channels 4 are ensured, water between the ground contact surface 3*a* and the ground can be drained smoothly by the internal lateral channels 5 through the radial channels 4. Accordingly, the tyre 1 according to the embodiment can improve wet performance and on-ice performance in a well-balanced manner.

The radially outer ends of the radial channels 4 have openings 8 on the ground contact surface 3*a*. In this embodiment, the openings 8 of the radial channels 4 are configured as a circular shape. The internal lateral channels 5 have openings 9 which are opened at the sidewalls 3*b*. In this embodiment, the openings 9 of the internal lateral channels 5 are also configured as a circular shape. Note that the openings 8 and 9 are not limited to the above aspects but can be modified as a polygonal shape, e.g., including a rectangular shape.

Regarding the radial channels 4, circumferential opening widths Wb of the openings 8 are not limited but is preferably smaller than the opening widths Wa of the radial channels 4, for example. Such a shape of the radial channels 4 can collect and drain water under the ground contact surface 3*a* effectively by using the rotation of the tyre 1 while suppressing excessive reduction in rigidity of the land portions 3. In view of this, in the openings 8 of the radial channels 4, the circumferential opening widths Wb are preferably in a range of from 60% to 90% of the axial opening widths Wa. Preferably, the openings 8 of the radial channels 4 are configured as an elliptic shape having the major axis extending in the tyre axial direction.

The radial channels 4, in this embodiment, extend in the tyre radial direction with a constant cross-section area such that water passes through the radial channels 4 smoothly, thereby improving wet performance further. Alternately, the radial channels 4 may have a cross-section area A1 which gradually increases radially inwardly to improve wet performance. Further, in order to suppress excessive reduction in rigidity of the land portions 3, the radial channels 4 may have a cross-section area A1 which gradually decreases radially inwardly.

In this embodiment, the radial channels 4 extend in a straight shape to drain water from under the ground contact surface 3*a* smoothly through the internal lateral channels 5. The radial channels 4, in this embodiment, extend in a normal direction of virtual ground contact surfaces 8*a* which are surfaces closing the openings 8. Alternately, the radial channels 4 may be inclined with respect to the normal direction, for example.

Preferably, the openings 8 of the radial channels 4 are located in an axial middle region of the land portions 3, thus collecting and draining effectively the water therefrom where it is difficult to remove. In view of this, axial distances L1 from the sidewalls 3*b* to the centers of the openings 8 are preferably ranging from 40% to 60% of the axial widths Wt of the land portions 3.

The radial channels 4 are spaced in the tyre circumferential direction. The radial channels 4, in order to improve wet and on-ice performance in a well-balanced manner, may be arranged at circumferential pitches P ranging from 20 to 50 mm.

Preferably, the internal lateral channels 5 are inclined at angles θ1 equal to or less than 45 degrees with respect to the tyre axial direction. Thus, the internal lateral channels 5 can drain water therein smoothly out of the openings 9 using the rotation of the tyre 1. In view of this, the angles θ1 of the internal lateral channels 5 are preferably equal to or more than 10 degrees, more preferably equal to or more than 20 degrees, still further preferably equal to or more than 30 degrees. When the angles θ1 of the internal lateral channels 5 are greater than 45 degrees, rigidity of the land portions 3 tends to reduce excessively since lengths of the internal lateral channels 5 become large.

The internal lateral channels 5, in this embodiment shown in FIG. 2, open at both axially spaced sidewalls 3b of the land portion to further improve wet performance.

Each internal lateral channel 5, in this embodiment, includes a first internal lateral channel 5A and a second internal lateral channel 5B integrally. Further, the second internal lateral channel 5B extends in a direction crossing the first internal lateral channel 5A. Each of the first internal lateral channel 5A and the second internal lateral channel 5B according to the embodiment communicates with one radial channel 4, and extends from the radial channel 4 toward a circumferential one side, e.g., toward upward in FIG. 2. Such an internal lateral channel 5 can drain water out of either one of the openings 9 smoothly regardless of the cornering direction in right and left.

As used herein, the "direction crossing" with respect to the first and second internal lateral channels 5A and 5B means that the first and second internal lateral channels 5A and 5B have different angles from each other with respect to the tyre axial direction, and which includes various aspects, e.g., the first and second internal lateral channels 5A and 5B form a cross-shape. Further, the first and second internal lateral channels 5A and 5B may be connected directly, or connected indirectly through one or more the radial channels 4. Furthermore, the above-mentioned definition can be applied to not only the internal lateral channels 5 but also the radial channels 4 and the sipes 6.

The first internal lateral channel 5A and the second internal lateral channel 5B, in this embodiment, extend in a substantially straight shape along the ground contact surface 3a. Note that the first internal lateral channel 5A as well as the second internal lateral channel 5B may be inclined inwardly or outwardly in the tyre radial direction (not illustrated).

Preferably, the internal lateral channels 5 have a cross-section having a maximum diameter Wc ranging from 3 to 8 mm. When the maximum diameter Wc of the internal lateral channels 5 is less than 3 mm, there is a risk that the internal lateral channels 5 may not drain water smoothly out of the openings 9. When the maximum diameter Wc of the internal lateral channels 5 is more than 8 mm, there is a risk that rigidity of the land portions 3 decreases excessively.

Each internal lateral channel 5, in this embodiment, is configured to extend in a constant cross-section in the longitudinal direction, discharging water smoothly to improve wet performance. Alternately, each internal lateral channel 5, for example, may have a cross-section having a cross-sectional area A2 which increases toward the opening 9 (not illustrated) to further improve the above-mentioned effect as well as to enhance rigidity of the land portion 3.

As illustrated in FIG. 1, the openings 9 of the internal lateral channels 5, in this embodiment, are configured as an elliptic shape having the minor axis extending in the tyre radial direction to drain water in the internal lateral channels 5 smoothly while ensuring rigidity of the land portion 3. Note that the internal lateral channels 5 are not limited to such an aspect but may be modified to have a circular cross-section or an elliptic cross-section having the major axis extending in the tyre radial direction.

Preferably, areas S2 of the openings 9 of the internal lateral channels 5 are greater than areas S1 of the openings 8 of the radial channels 4. When the areas S2 of the openings 9 of the internal lateral channels 5 are smaller than the areas S1 of the openings 8 of the radial channels 4, it may be difficult to drain water collected into the radial channels 4 using the openings 9 smoothly. In order to further improve wet performance, the areas S2 of the openings 9 of the internal lateral channels 5 are preferably in a range of from 120% to 150% of the areas S1 of the openings 8 of the radial channels 4.

Preferably, the openings 9 of the internal lateral channels 5 are located from the ground contact surface 3a at distances Ha ranging from 60% to 95% of heights H1 of the sidewalls 3b, for example. When the distances Ha are less than 60% of the heights H1 of the sidewalls 3b, rigidity of the land portions 3 proximate to the ground contact surface 3a is prone to be small. When the distances Ha are greater than 95% of the heights H1 of the sidewalls 3b, draining water in the internal lateral channels 5 may be obstructed by water remains in the main grooves G, for example. As used herein, the distances Ha mean radial distances from the radial centers of the openings 9 to the ground contact surface 3a. Note that when one sidewall 3b is formed by the buttress surface Ta, the height H1 of the sidewall 3b is defined as a height of the sidewall 3b that is adjacent to the buttress surface Ta in the tyre axial direction.

The sipes 6 according to the embodiment extend in a straight shape to generate a large traction on icy road by increasing the scratching effect thereof. Note that the sipes 6 are not limited to such an aspect but can be modified to have zigzag or wavy shapes, for example.

In this embodiment, each sipe 6 extends in such a manner as to communicate with both one radial channel 4 and one sidewall 3b. This structure is helpful to provide the sufficient sipe edges. Note that the sipes 6 are not limited to such an aspect but can be modified to terminate within the ground contact surface 3a without reaching one or more sidewalls 3b.

The sipes 6 are inclined at angles with respect to the tyre axial direction to improve cornering performance and straight-ahead stability on icy road using its axial and circumferential edge components.

Each sipe 6, in this embodiment, extends along each corresponding internal lateral channel 5. Thus, since the sipes 6 are arranged such that the width directions of sipes 6 correspond to the width directions of the internal lateral channels 5, upon grounding of the sipes 6, both edges 6e of the sipes 6 can scratch icy road effectively to generate large traction. In view of this, absolute values of angle differences ($\theta 1 - \theta 2$) between the angles $\theta 2$ of the sipes 6 with respect to the tyre axial direction and the angles $\theta 1$ of the internal lateral channels 5 with respect to the tyre axial direction are preferably equal to or less than 10 degrees, more preferably equal to or less than 5 degrees.

The sipes 6, in this embodiment, are arranged on the center lines 5c of the internal lateral channels 5 in the width direction. This aspect can be useful to suppress excessive reduction in rigidity of the land portions 3 since the radial lengths of the sipes 6 tend to be the minimum when the internal lateral channels 5 have a circular cross-sectional shape as this embodiment.

In this embodiment, the sipes 6 each include a first sipe 6A and a second sipe 6B. The first sipe 6A extends to connect one first internal lateral channel 5A and the ground contact surface 3a. The second sipe 6B extends to connect one second internal lateral channel 5B and the ground contact surface 3a. The first sipe 6A and the second sipe 6B are connected with one another through one radial channel 4.

Figure 3A:
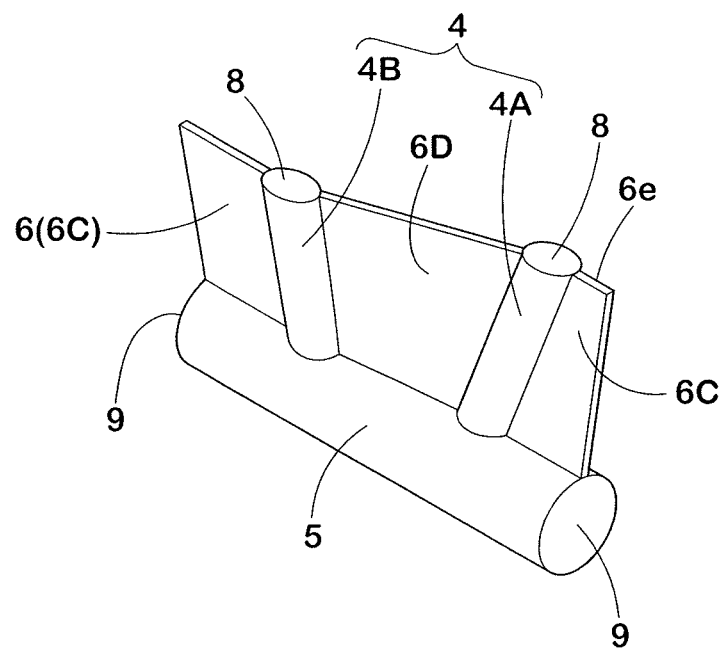
FIGS. 3A and 3B are perspective views showing other embodiments of a radial channel, an internal lateral channel and a sipe conceptually.

FIG. 3A illustrates a conceptual perspective view of radial channels 4 in accordance with another embodiment. As illustrated in FIG. 3A, the radial channels 4, for example, include a first radial channel 4A and a second radial channel 4B that extends in a direction crossing to the first radial channel 4A. In this embodiment, the first radial channel 4A and the second radial channel 4B have respective openings 8 on the ground contact surface 3a. That is, the first radial channel 4A and the second radial channel 4B are independent from one another. Such radial channels 4 can improve wet performance since the holes 4 can take in much water from between the ground and the ground contact surface 3a. In this embodiment, the first radial channel 4A is communicated with the second radial channel 4B through one internal lateral channel 5.

In this embodiment, the sipes 6 include two third sipes 6C each of which extends from a respective one of the radial channels 4 to a respective one of the sidewalls (not illustrated), and a fourth sipe 6D which connects the first radial channel 4A and the second radial channel 4B. In this embodiment, the third sipes 6C extends in a different angle to the fourth sipe 6D in the tyre axial direction to further improve on-ice performance.

Figure 3B:
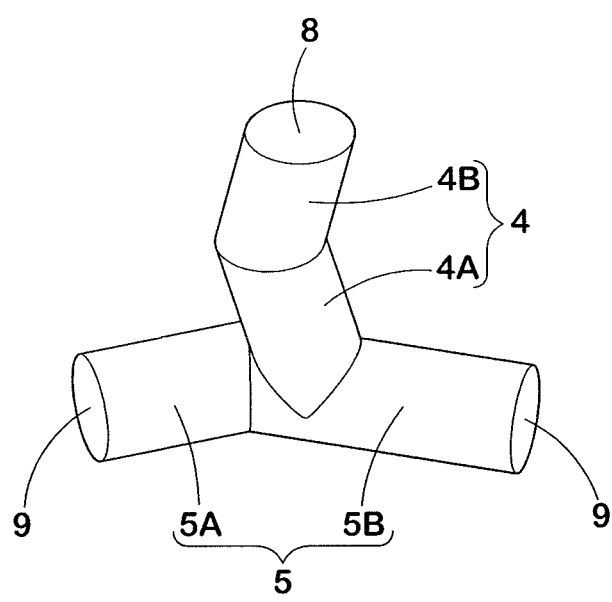

FIG. 3B illustrates a conceptual perspective view of a radial channel 4 and an internal lateral channel 5 in accordance with yet another embodiment. In FIG. 3B, although one or more sipes 6 are omitted as a matter of convenience, note that one or more sipes 4 which open at the ground contact surface 3a and are in communication with the radial channel 4 as well as the internal lateral channel 5 are provided as mentioned above. In this embodiment, the radial channel 4 includes a first radial channel 4A and a second radial channel 4B extending in a direction crossing to the first radial channel 4A. The first radial channel 4A is directly connected to the second radial channel 4B, for example. In this embodiment, the internal lateral channel 5 includes a first internal lateral channel 5A and a second internal lateral channel 5B extending in a direction crossing to the first internal lateral channel 5A. The first internal lateral channel 5A is directly connected to the second internal lateral channel 5B, for example.

Figure 4A:
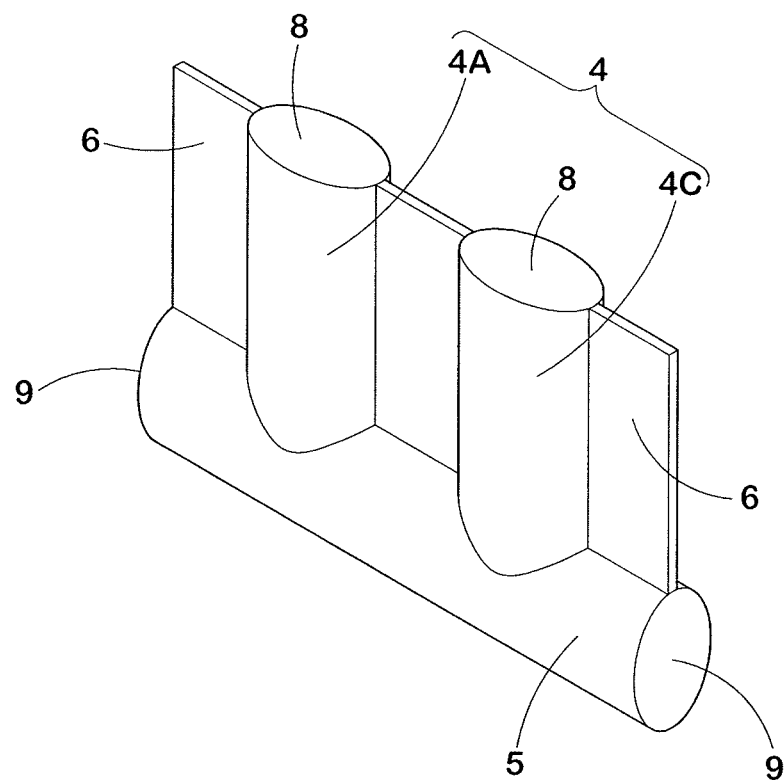
FIGS. 4A and 4B are perspective views of yet other embodiments of the radial channel, the internal lateral channel and the sipe conceptually.

FIG. 4A illustrates a conceptual perspective view of radial channels 4 in accordance with yet another embodiment. As illustrated in FIG. 4A, the radial channels 4 include a first radial channel 4A and a third radial channel 4C extending in parallel with the first radial channels 4A. The radial channels 4 as mentioned above can improve wet performance.

In FIG. 4A, the radial channels 4 are configured to have an elliptic cross-section. preferably, the major axes of the openings 8 of radial channels 4 are parallel with the longitudinal direction of the sipes 6 and the internal lateral channels 5.

Figure 4B:
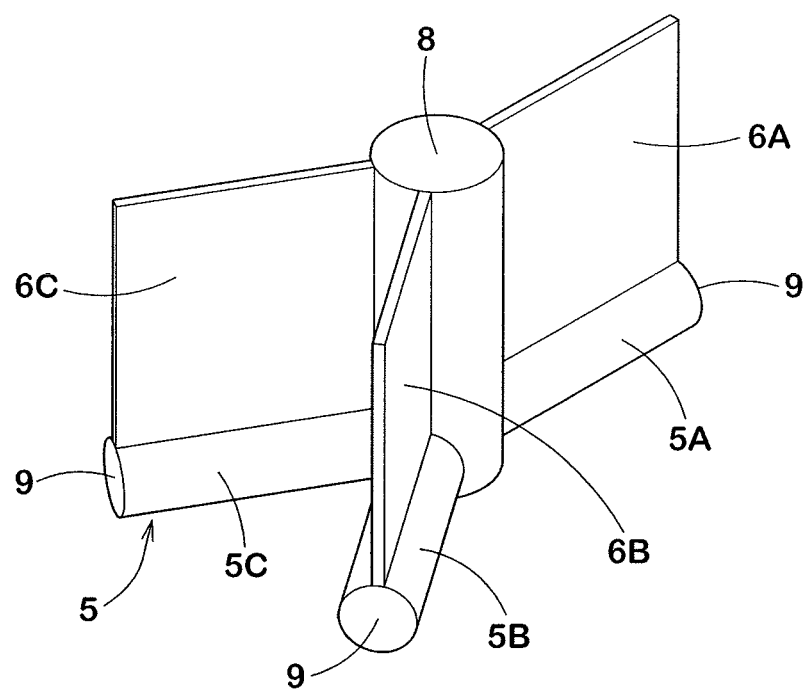

FIG. 4B illustrates a conceptual perspective view of the internal lateral channel 5 and the sipes 6 in accordance with yet another embodiment. As illustrated in FIG. 4B, the internal lateral channel 5 according to the embodiment include a first internal lateral channel 5A, a second internal lateral channel 5B extending in a direction crossing to the first internal lateral channel 5A, and a third internal lateral channels 5C extending in a direction crossing to not only the first internal lateral channel 5A but also the second internal lateral channel 5B. The first internal lateral channel 5A, the second internal lateral channel 5B and the third internal lateral channel 5C each have a respective one opening 9 which opens at the sidewalls (not illustrated) and the other end which is in communication with the radial channel 4. These internal lateral channels 5A, 5B and 5C can also exhibit superior wet performance. The first internal lateral channel 5A, the second internal lateral channel 5B and the third internal lateral channel 5C extends in a straight shape, in FIG. 4B.

Further, in FIG. 4B, the sipes 6 include a first sipes 6A extending between the first internal lateral channel 5A and the ground contact surface (not illustrated), a second sipe 6B extending between the second internal lateral channels 5B and the ground contact surface, and a third sipe 6C extending between the third internal lateral channel 5C and the ground contact surface. This structure can increase edge components, improving wet performance. In this embodiment, the first, second and third sipes 6A, 6B and 6C respectively extend on the center lines of the first, second and third internal lateral channels 5A, 5B and 5C in a plan view of the tread portion 2.

Figure 5A:
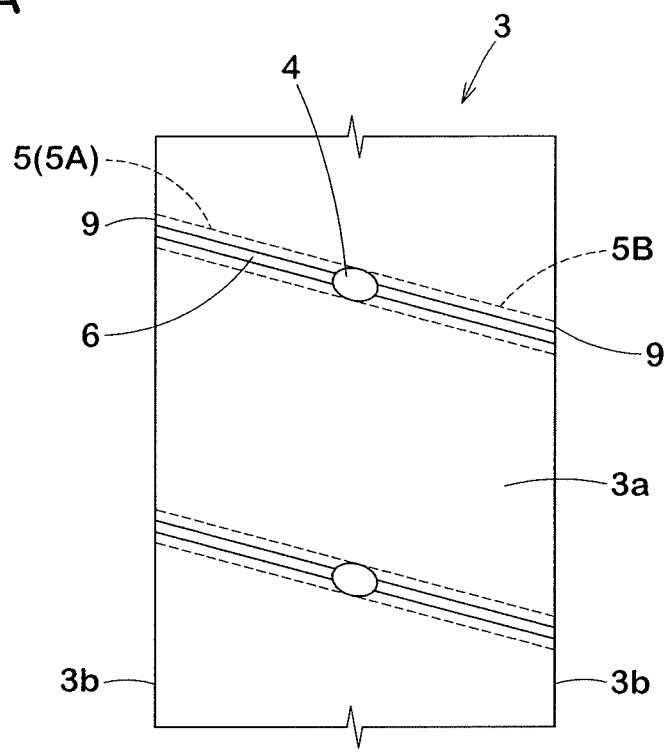
FIGS. 5A and 5B are plan views of yet other embodiments of the land portion.

FIG. 5A illustrates a plan view of one land portion 3 in accordance with yet another embodiment. As illustrated in FIG. 5A, the internal lateral channels 5 include two channels 5A and 5B which are aligned to form one straight line from one sidewall 3b to the other sidewall 3b. Further, the sipes 6 include two sipes which are aligned to form one straight line from one sidewall 3b to the other sidewall 3b. This structure provides less drainage resistance.

In the embodiment as shown in FIG. 5A, the internal lateral channels 5 are inclined at an angle with respect to the tyre axial direction, e.g., right downward in the embodiment. The internal lateral channels 5 according to this embodiment, regardless of the rotational direction of tyre 1, can drain water taken in the radial channel 4 throughout either one of the openings 9. Note that the internal lateral channels 5, for example, may extend along (i.e., parallel with) the tyre axial direction.

Figure 5B:
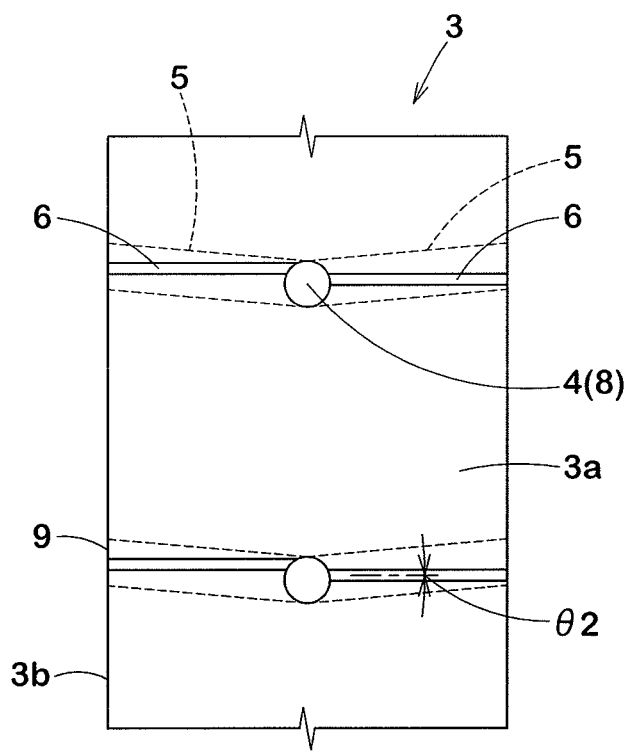

FIG. 5B illustrates a plan view of one land portion 3 in accordance with yet another embodiment. As illustrated in FIG. 5B, the sipes 6 extend at an angle θ2 equal to or less than 5 degrees with respect to the tyre axial direction. Thus, on-ice driving stability can be improved by increasing traction on icy road. In some preferred embodiments as shown in FIG. 5B, the internal lateral channels 5 are inclined with respect to the sipes 6. That is, the internal lateral channels 5 extends in aa direction have the different angle with respect to the angle θ1 of the sipes 6.

In the above embodiments, the land portions 3 are configured as ribs extending continuously in the tyre circumferential direction. However, the land portions 3 are not limited to such an aspect but can be configured as block rows which are divided by lateral grooves (not illustrated). Further, the radial channels 4, internal lateral channels 5 and sipes 6 may be provided on all land portions 3 of the tread portion 2, or may be provided on only some land portions 3.

While the particularly preferable embodiments in accordance with the present disclosure have been described in detail, the present disclosure is not limited to the illustrated embodiments, but can be modified and carried out in various aspects.

EXAMPLE

Passenger car tyres 255/50R20 with a basic tread pattern as shown in FIG. 1 were prototyped based on the specification in Table 1. Then, wet performance and on-ice performance of each test tyre were evaluated. The common specification and the testing method for the test tyres are as follows:

tread portion with four land portions each with radial channels, internal lateral channels and sipes;

arrangement pitches P of radial channels: 30 mm;

opening area ratios S2/S1: 120%; and maximum lengths Wc of openings of internal lateral channels: 4 mm.

Wet Performance/On-Ice Performance Test:

Each test tyre was installed to a passenger car having a displacement of 3700 cc, as its all wheels, under the following condition:

rim size: 20×8J, and tyre inner pressure: 250 kPa.

Then, a test driver drove the passenger car on a test course having both icy road and wet asphalt road to evaluate driving performance such as steering stability, grip, and steering response of the tyre by the driver's sense. The test results are indicated in Table 1 using a scoring system where Ref. 1 is set to 100. The larger value indicates better performance.

Table 1 shows the test results.

TABLE 1

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| Wa/Wt (%) | 3 | 23 | 5 | 20 | 12.5 | 12.5 | 12.5 | 12.5 |
| θ1 (degrees) | 45 | 45 | 45 | 45 | 45 | 50 | 30 | 20 |
| Wet performance [score] | 100 | 110 | 110 | 115 | 115 | 110 | 115 | 110 |
| On-ice performance [score] | 100 | 80 | 110 | 105 | 110 | 105 | 110 | 110 |

From the test results, it is confirmed that the example tyres improve wet performance and on-ice performance in a well-balanced manner compared with the comparative example tyres. Note that the same results as the above were confirmed on other tests in which tyres having different tyre size, tread shape and the like from the above tyres were used.

What is claimed is:

1. A tire comprising:
    a tread portion comprising at least one land portion, the at least one land portion having a ground contact surface and at least one sidewall; and
    the at least one land portion being provided with
        at least one radial channel extending to a radially inner end thereof from a radially outer end thereof opened at the ground contact surface,
    at least one internal lateral channel provided under the ground contact surface of the land portion, the at least one internal lateral channel extending from one end thereof opened at the at least one sidewall to the at least one radial channel, and
        at least one sipe extending radially inwardly from the ground contact surface to communicate with both the at least one radial channel and the at least one internal lateral channel,
    wherein the radially outer end of the at least one radial channel has an axial opening width in a range of from 5% to 20% of an axial width of the at least one land portion,
    wherein the at least one radial channel comprises a plurality of radial channels,
    wherein the at least one internal lateral channel comprises a plurality of internal lateral channels, and
    wherein the plurality of radial channels is spaced in a tire circumferential direction without being in communication with each other, or the plurality of internal lateral channels is spaced in the tire circumferential direction without being in communication with each other,
    wherein the at least one radial channel comprises a first radial channel and a second radial channel that extends in a direction crossing to the first radial channel, and
    the first radial channel and the second radial channel are communicated with a same lateral channel in the at least one lateral channel.

2. The tire according to claim 1, wherein the at least one internal lateral channel is inclined at an angle offset from a tire axial direction by an angle equal to or less than 45 degrees with respect to a tire axial direction.

3. The tire according to claim 2, wherein the at least one internal lateral channel comprises a first internal lateral channel and a second internal lateral channel extending in a direction crossing the first internal lateral channel.

4. The tire according to claim 1, wherein the at least one internal lateral channel comprises a first internal lateral channel and a second internal lateral channel extending in a direction crossing the first internal lateral channel.

5. The tire according to claim 4, wherein the at least one land portion comprises axially spaced two sidewalls, and the at least one internal lateral channel is opened at the respective sidewalls.

6. The tire according to claim 1, wherein the at least one internal lateral channel has a channel cross-section having a maximum diameter of from 3 to 8 mm.

7. The tire according to claim 1, wherein the at least one land portion comprises axially spaced two sidewalls, and the at least one internal lateral channel is opened at the respective sidewalls.

8. The tire according to claim 1, wherein the first internal lateral channel and the second internal lateral channel are inclined in the tire axial direction in an opposite direction with each other.

9. The tire according to claim 8, wherein the first internal lateral channel and the second internal lateral channel are inclined at an angle offset from the tire axial direction by an angle equal to or less than 45 degrees.

10. The tire according to claim 8, wherein the at least one sidewall comprises two sidewalls located both sides in the tire axial direction of the at least one land portion, and
    the first internal lateral channel is opened at one of the two sidewall and the second internal lateral channel is opened at the other one of the two sidewalls.

11. The tire according to claim 1, wherein the at least one radial channel has a cross-section area that increases continuously inwardly in a tire radial direction.

12. The tire according to claim 1, wherein an opening of the at least one internal lateral channel has an elliptic shape having a minor axis extending in a tire radial direction.

13. The tire according to claim 1, wherein an area of an opening of the at least one internal lateral channel is in a range of from 120% to 150% of an area of an opening of the at least one radial channel.

14. The tire according to claim 1, wherein the at least one radial channel comprises a first radial channel and a second radial channel that extends in a direction crossing to the first radial channel, and
    wherein the first radial channel is directly connected to the second radial channel such that the at least one radial channel is bent.

15. The tire according to claim 1, wherein the at least one internal lateral channel comprises a first internal lateral channel and a second internal lateral channel,
    wherein both the first internal lateral channel and the second internal lateral channel are communicated with a same radial channel in the at least one radial channel, and wherein the first internal lateral channel and the second internal lateral channel extend from the same radial channel toward a circumferential first side.

16. The tire according to claim 1, wherein the at least one radial channel has a circumferential opening width smaller than the axial opening width thereof.

\* \* \* \* \*